United States Patent [19]

Scales

[11] Patent Number: 4,597,416
[45] Date of Patent: Jul. 1, 1986

[54] AUTOMOTIVE AIR CONDITIONING SYSTEM FLUSHING APPARATUS

[76] Inventor: Frank J. Scales, 901 S. Second St., San Jose, Calif. 95112

[21] Appl. No.: 652,747

[22] Filed: Sep. 19, 1984

[51] Int. Cl.⁴ ............................................. B60P 3/22
[52] U.S. Cl. ................... 137/899.4; 137/559; 137/597; 134/169 A
[58] Field of Search ............... 137/899.4, 355.12, 559, 137/574, 597; 165/95; 134/169 A, 169 R, 102, 103, 186

[56] References Cited

U.S. PATENT DOCUMENTS

| | | | |
|---|---|---|---|
| 1,585,025 | 5/1926 | Gorschalki et al. | 134/169 A |
| 2,029,232 | 1/1936 | Green | 165/95 |
| 2,222,516 | 11/1940 | Powell et al. | 141/1 |
| 2,510,701 | 6/1950 | La Cross | 134/95 |
| 2,835,261 | 5/1958 | Wogan | 134/56 |
| 3,431,145 | 3/1969 | Riley | 134/22 |
| 3,528,854 | 9/1970 | Rutherford | 134/23 |
| 4,015,613 | 4/1977 | Papworth | 134/102 |
| 4,059,123 | 11/1977 | Bartos et al. | 134/169 A |
| 4,109,703 | 8/1978 | Babish et al. | 165/95 |
| 4,127,160 | 11/1978 | Joffe | 134/169 A |
| 4,276,914 | 7/1981 | Albertson | 134/169 A |
| 4,412,551 | 11/1983 | Peters et al. | 134/169 A |

Primary Examiner—A. Michael Chambers
Assistant Examiner—Sheri M. Novack
Attorney, Agent, or Firm—Thomas Schneck

[57] ABSTRACT

An automotive air conditioning flushing apparatus having a solvent tank separated from a catch basin by means of a pressure tank and multiple position sequencing valve. A handle of the valve rotates through positions which sequentially direct solvent into the pressure tank by gravity feed, then pressurize the solvent from a remote pressure source and cause pressurized fluid to be delivered into an automotive cooling system, then release pressure and dispose of excess cleaning solvent. Lastly, the handle may be rotated to an off position. System components are stacked one above the other on an upright wheeled frame so that the entire apparatus may be easily moved about in an automotive service facility.

14 Claims, 7 Drawing Figures

AUTOMOTIVE AIR CONDITIONING SYSTEM FLUSHING APPARATUS

TECHNICAL FIELD

The invention relates to apparatus for cleaning automotive air conditioning systems of automobiles.

BACKGROUND ART

Mobile flushing devices for automobiles are known. For example, U.S. Pat. No. 3,431,145 to Riley shows a wheeled container having plural compartments and a means for injecting air under pressure for forcing fluid in one of the compartments into an automotive cooling system. While many devices of the prior art employ similar principals, there is a need for a flushing apparatus with a mechanism for protection against mistakes in carrying out the flusing operation. In a garage environment, mechanics are frequently interrupted in the middle of a job. In prior art devices, it is difficult to determine the state of a flushing operation, just by viewing the apparatus. An object of the present invention was to devise a flushing apparatus for automotive air conditioning systems whose condition in carrying out the multiple steps of a flushing operation would be apparent by viewing the device. Another object was to devise a compact construction for an air conditioning flushing apparatus which would fit in narrow spaces in an automotive garage.

SUMMARY OF INVENTION

The above objects have been achieved with a mobile flushing system which features a multiple position valve, with various handle positions corresponding to the steps of a flushing operation. Further, transparent tanks are provided for determining the presence or absence of clean and dirty solvent.

The multiple position valve features a first position for enabling solvent flow from a solvent tank to a pressure tank. A second position of the valve pressurizes the pressure tank and causes pressurized solvent to leave the tank toward an automotive air conditioning system. A third position is for pressure release from the pressure tank, allowing unused solvent to be dumped into a catch basin mounted below the pressure cylinder. A fourth position of the sequencing valve represents an "off" position.

In construction, an upright, wheeled, hand-truck is employed for the support structure. The hand-truck has an upright frame which is tubular extending approximately chest-high on an adult. The frame has a handle which may be formed from the tubular material or may be projecting rearwardly from the tubular material. The frame further comprises a panel of sheet material which is connected to the tubular material and serves as a base for supporting the solvent tank, pressure tank and valve and catch basin, plus the necessary accompanying hoses. The hand-truck has a lower forwardly projecting support lip which holds the catch basin. The catch basin, pressure tank and solvent tank are generally vertically aligned and, because of the limited volume of automotive air conditioning systems, do not extend much further forwardly than the support lip. This enables the hand-truck to be moved into narrow spaces, such as those existing between automobiles in a service facility.

The flushing apparatus of the present invention is easy to use, light weight, and has safety provisions not found in the prior art.

BEST MODE FOR CARRYING OUT THE INVENTION

Figure 1:
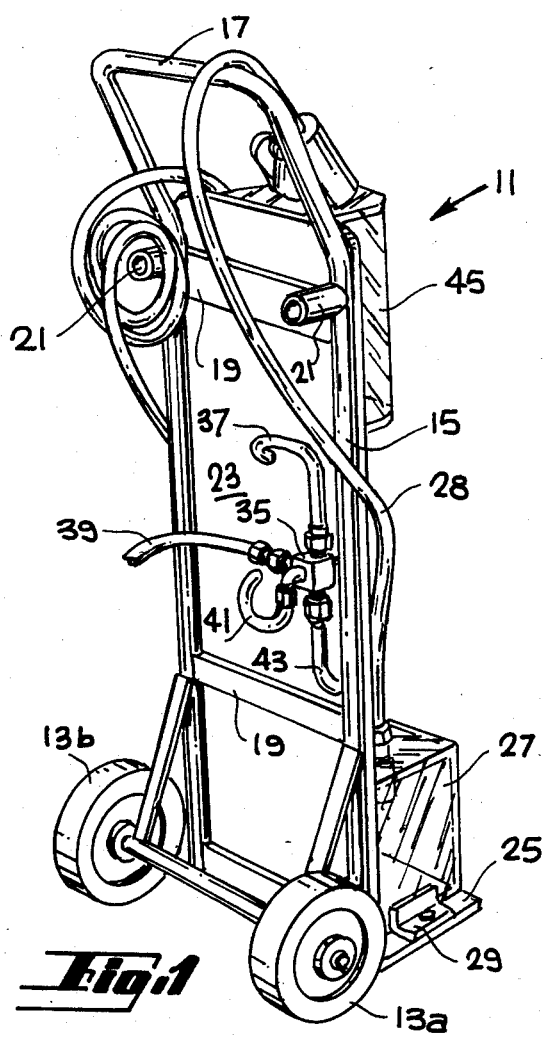
FIG. 1 is a rear perspective view of the apparatus of the present invention.
Figure 2:
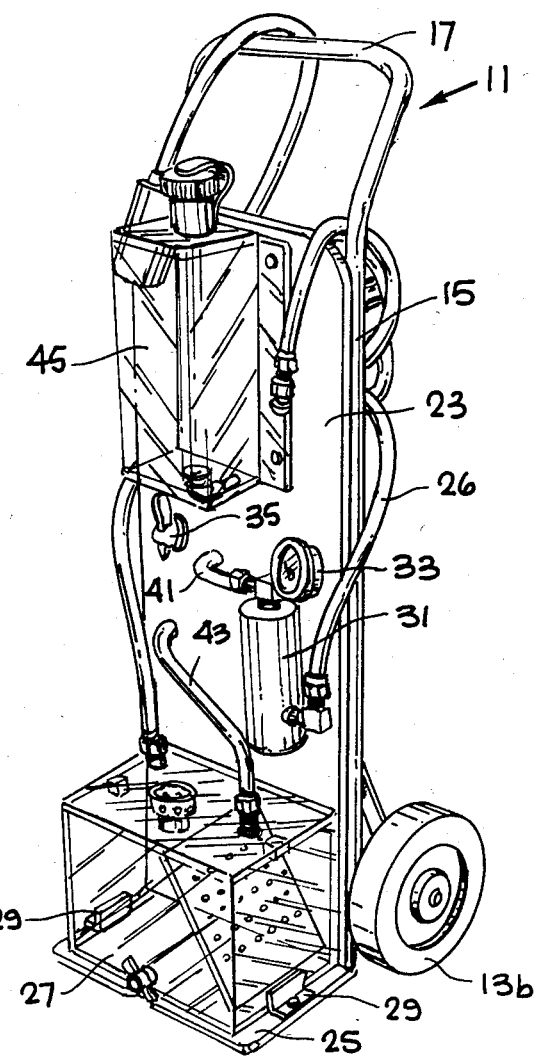
FIG. 2 is a front perspective view of the apparatus illustrated in FIG. 1.

With reference to FIGS. 1 and 2, a hand-truck 11 is shown having a pair of wheels 13a and 13b, an upright tubular frame 15 having a top 17 which connects left and right tubular side members. Braces 19 also connect opposed frame side members. Top 17 is typically waist-to-chest high on an adult person and the top may be curved rearwardly to serve as a handle in the usual way. Alternatively, a handle may be connected to the frame, indicated by handle members 21. A sheet panel 23 is secured to the frame and serves as a mounting base for flushing system components. Panel material may be wood, a synthetic material or metal. Three-quarter inch plywood is an ideal material. A lip 25 projects forwardly from the frame at ground level. The support lip is approximately 18 inches in width and projects forwardly from the frame approximately 12 inches. These dimensions are not critical, so long as the lip 25 is able to adequately support catch basin 27, mounted on lip 25 by brackets 29.

The support panel mounts a pressure tank 31 having a visible pressure gauge 33. The pressure tank is mounted above catch basin 27 and slightly to one side of the panel. On the opposite side a multi-position valve 35 is mounted having multiple inlets and outlets. These inlets and outlets, visible in FIG. 1 on the backside of the panel, include a line 37 carrying a supply of solvent from the solvent tank to the valve; line 39 connected to a remote fluidic pressure tank, such as an air tank; line 41 transmitting solvent and fluidic pressure to the pressure tank; line 43 connected to catch basin 27 for pressure relief.

Above the valve, a solvent tank 45 is mounted. This solvent tank is preferably transparent, just like catch basin 27 so that solvent volume is readily apparent, including clean solvent in solvent tank 45 or dirty solvent in catch basin 27. A first long hose 26 is used to deliver pressurized solvent from pressure tank 31 to the inlet of an automotive air conditioning system. A second long hose 28 is used to bring dirty solvent from the outlet of an automotive air conditioning system into catch basin 27.

Figure 3:
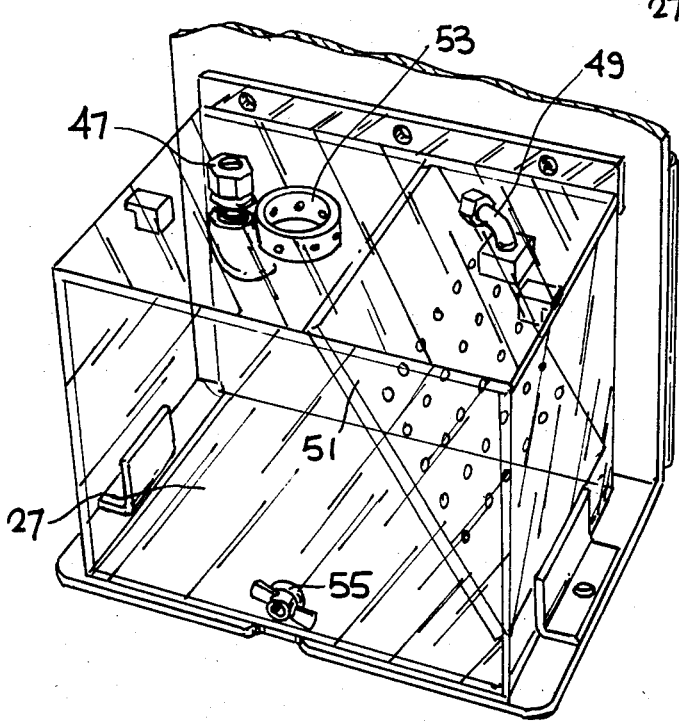
FIG. 3 is a perspective detail of the apparatus illustrated in FIG. 2, featuring a catch basin.

FIG. 3 shows the details of catch basin 27, including a first fitting 47 for connection to a hose extending from the outlet port of an automotive air conditioning system. A second fitting 49 connects with a pressure relief hose extending from the valve. An optional baffle 51 may be provided for sound dampening purposes. The baffle includes a number of holes which allow liquid falling on one side of the baffle to travel to the other side and to equalize pressure on both sides of the baffle. A vent 53 is provided to equalize pressure inside and outside of the basin. A spigot 55 is provided for emptying the catch basin.

Figure 4:
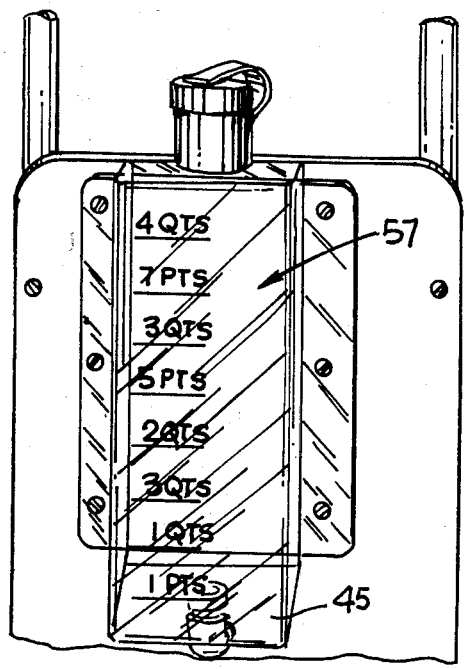
FIG. 4 is a front perspective view of a detail of the apparatus shown in FIG. 2, featuring a solvent tank.

With reference to FIG. 4, solvent tank 45 is seen in closer detail. The tank may be provided with gradations 57 for determining the volumetric level present in the tank and flowing into the pressure tank.

Figure 5:
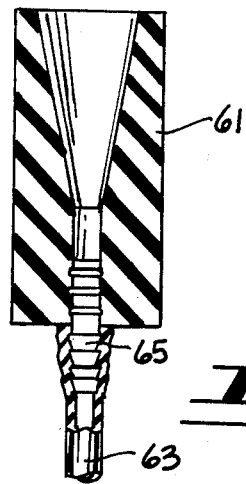
FIG. 5 is a sectional view of a fitting employed in the present invention.
Figure 6:
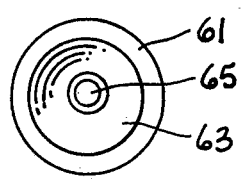
FIG. 6 is a front elevation of the fitting illustrated in FIG. 5.

FIGS. 5 and 6 show the manner of connection of hoses to an automotive air conditioning system. The air conditioning system typically has a rubber hose 61 aasociated with an inlet or outlet. A second hose 63 connects the flushing apparatus of the present invention with an air conditioning system. A metal or plastic ribbed pipe 65 connects the two together.

Figure 7:
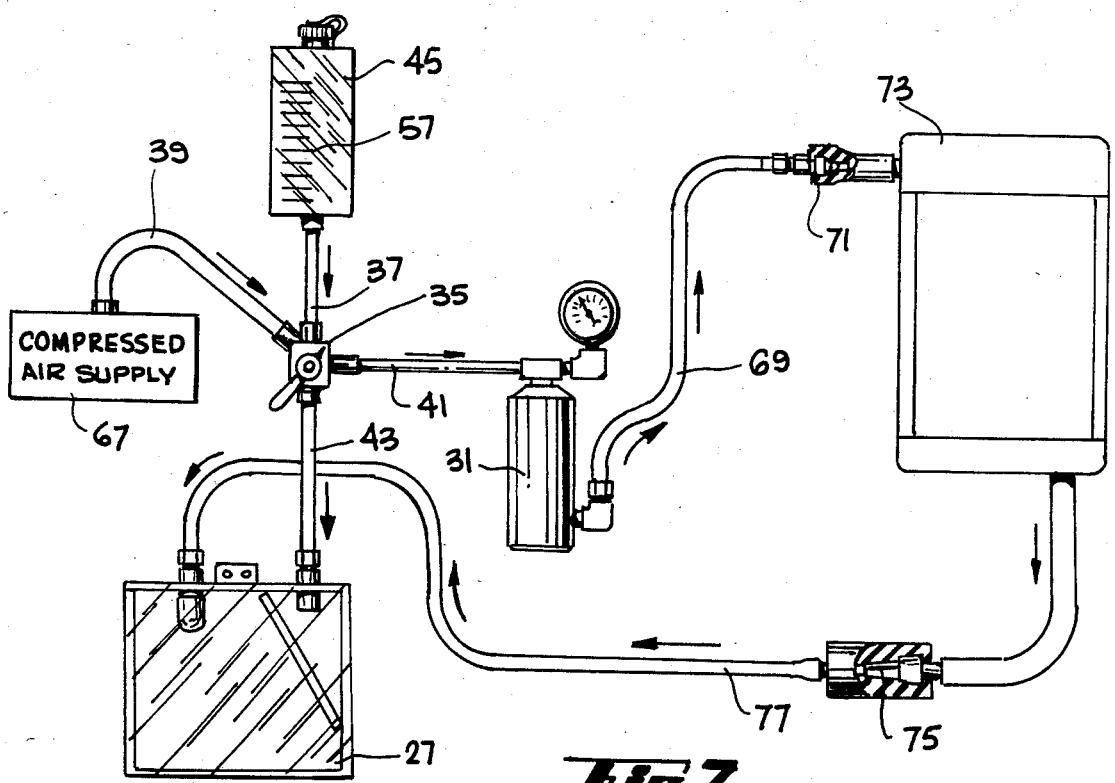
FIG. 7 is a plan view illustrating use of the apparatus of the present invention.

Operation of the invention may be seen with reference to FIG. 7. A sequencing valve 35 is first placed in the 12 o'clock position allowing fluid from solvent tank 45 to flow downwardly through hose 37 through the valve and through hose 41 into pressure tank 31 by gravity flow. The volume of tank 31 may limit the amount of solvent admitted to the tank or an operator may judge the amount by gradations on the solvent tank. Both of these approaches are used to limit solvent volume to an amount of solvent for one cleaning cycle. A second position of the handle of valve 35 is the three o'clock position which causes fluid pressure from a remote supply 67 to be delivered through hose 39 to the valve and onto the pressure tank 31. On reaching a predetermined pressure, pressurized solvent is forced out of the pressure tank and through hose 69 to the junction 71 which introduces pressurized solvent to the automotive air conditioning system 73. On passing through the air conditioning system, dirty solvent travels through a second junction 75 and into return hose 77 for delivery into catch basin 27. In a third position, when the handle of valve 35 is in the six o'clock position, pressure from the pressure tank may be relieved and unused solvent dumped through hose 43 from the tank into the catch basin. Lastly, when the handle of valve 35 is in the nine o'clock position, the valve is secured and in an off condition.

The sequential movements of the valve handle allow an operator to immediately determine which cleaning operation is in progress, even if the person is interrupted. Since the pressure tank is usually of a size which holds only enough solvent for a single cleaning cycle, it is not possible to treat readings on pressure valve 33 in an ambiguous manner. If the pressure on the valve corresponds approximately to the pressure at fluidic pressure supply 67, then the tank has not been discharged and is ready for discharge. On the other hand, if pressure is less than the supply pressure, pressurized solvent has been released to the air conditioning system and the next step is pressure relief. Thus, even if valve 35 becomes inoperative, pressure gauge 33 is indicative of the state of the pressure tank. Although the pressure tank only holds enough solvent for a single cleaning cycle, the volume introduced is somewhat variable and is controlled by the duration of the handle of valve 35 in the twelve o'clock position. A user may watch the gradations 57 to determine when a sufficient volume of solvent has flowed into the pressure tank for a cleaning operation of a particular automotive component.

Besides the apparent safety features of the present invention, components are stacked vertically, one above the other on a hand-truck. This is easily done since the volume in solvent tank 45 usually does not exceed much more than one gallon. This allows the automotive air conditioning flushing apparatus of the present invention to be moved between closely parked vehicles in an automotive service facility. The present invention is clean, convenient, easy to use and efficient. Moreover, the system lends itself to one-man operation.

I claim:

1. An apparatus for pressurized flushing of fluid chambers comprising, a support frame having wheels contacting the ground, a solvent tank connected to the frame, the tank having an inlet and an outlet, with a hose extending downwardly from the outlet, a catch basin mounted on the frame in vertical alignment with said solvent tank, said catch basin having a pair of inlets and an outlet, a pressure tank mounted on the frame in vertical alignment below said solvent tank and above said catch basin, said pressure tank having an input and an output and having sufficient solvent storage capacity for a single flush of said fluid chamber, a pressure gauge mounted to said pressure tank, and a valve associated with the pressure tank, said valve having fluidic connections to said solvent tank outlet hose, to said pressure tank input, to an inlet of said catch basin, and to a means for supplying fluidic pressure, said valve having a rotating handle which, when turned, sequentially admits solvent from the solvent tank to said pressure tank in a first position, then pressurizes said solvent with said fluidic pressure supply means in a second position, then releases pressure by directing pressurized solvent to said catch basin in a third position.

2. The apparatus of claim 1 wherein said solvent tank, pressure tank, valve and catch basin are aligned in vertical orientation one above the other.

3. The apparatus of claim 1 wherein said solvent tank and said catch basin are transparent.

4. The apparatus of claim 1 wherein said pressure supply means comprises a hose connected to a remote air pressure supply tank.

5. The apparatus of claim 1 wherein said valve is a four-position valve, the fourth position being a closed position.

6. The apparatus of claim 1 wherein said solvent tank includes a graduated solvent volume measuring scale.

7. An apparatus for pressurized flushing of automotive air conditioning systems comprising, an upright hand-truck having an upright frame, wheels connected to the frame for contacting the ground, a low-level support lip projecting from the frame and having a forward edge, the upright frame having a top at approximately chest height on an adult with a handle near the top of the frame, a solvent tank connected to the frame, the tank havng an inlet and an outlet, with a hose extending downwardly from the outlet, a catch basin mounted on the support lip aligned in vertical orientation below said solvent tank and having a pair of inlets and an outlet, a pressure tank mounted on the frame aligned in vertical orientation below said solvent tank and above said catch basin, said pressure tank having an input and an output and having sufficient solvent storing capacity for a single flush of said air conditioning system, a pressure gauge mounted to said pressure tank, and a valve associated with the pressure tank, said valve having fluidic connections to said solvent tank outlet hose, to said pressure tank input, to an inlet of said catch basin, and to a means for supplying fluidic pressure, said valve having a rotating handle which, when turned, sequentially admits solvent from the solvent tank to said pressure tank in a first position, then pressurizes said solvent with said fluidic pressure supply means in a second position, then releases pressure by directing pressurized solvent to said catch basin in a third position.

8. The apparatus of claim 7 wherein said solvent tank, pressure tank, valve and catch basin are aligned in vertical orientation in a manner limited in the extent of forward projection to the vicinity of the forward edge of said lip.

9. The apparatus of claim 7 wherein said frame comprises a braced tubular member connected to said lip and a panel, said panel securing said sovlent tank and said pressure tank.

10. The apparatus of claim 7 wherein said solvent tank and said catch basin are transparent.

11. The apparatus of claim 7 wherein said pressure supply means comprises a hose connected to a remote air pressure supply tank.

12. The apparatus of claim 7 wherein said catch basin and solvent tank are rectangular containers and said support lip is rectangular, the areawise dimensions of said support lip generally corresponding the the areawise dimensions of said catch basin.

13. The apparatus of claim 7 wherein said valve is a four-position valve, the fourth position being a closed position.

14. The apparatus of claim 7 wherein said solvent tank includes a graduated solvent volume measuring scale.

* * * * *